No. 835,412. PATENTED NOV. 6, 1906.
J. M. A. FAURE.
MACHINE FOR DECORTICATING RAMIE AND OTHER FIBROUS PLANTS.
APPLICATION FILED AUG. 5, 1905.
4 SHEETS—SHEET 1.
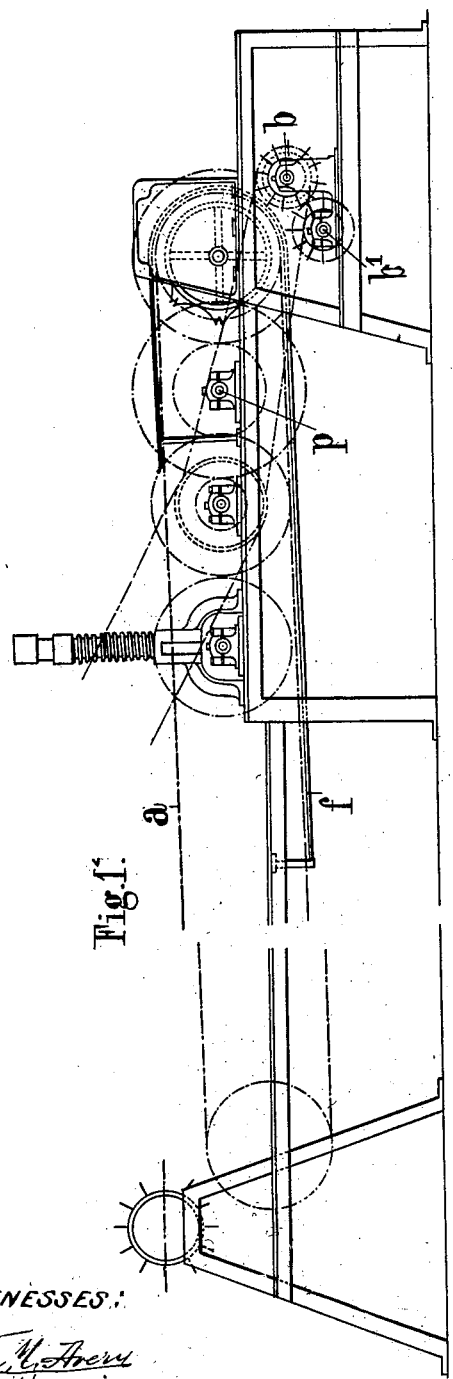
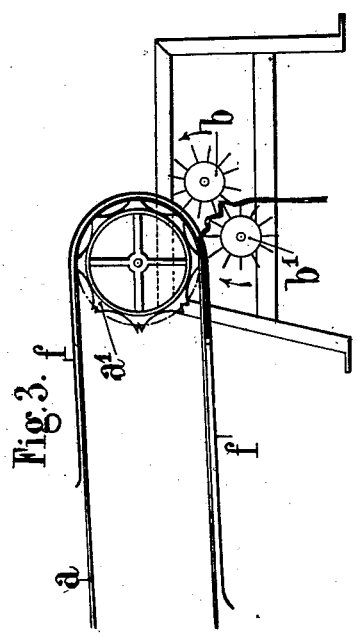
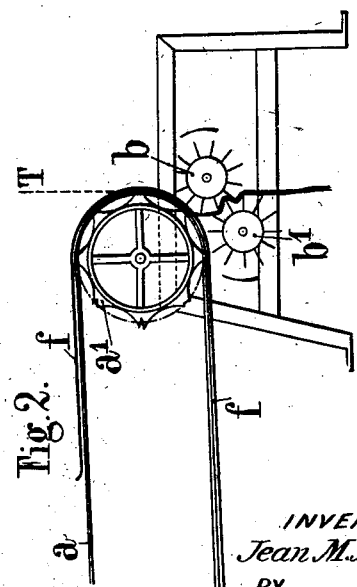
INVENTOR
Jean M. A. Faure
BY
Mann & Co.
ATTORNEYS
WITNESSES:

No. 835,412. PATENTED NOV. 6, 1906.
J. M. A. FAURE.
MACHINE FOR DECORTICATING RAMIE AND OTHER FIBROUS PLANTS.
APPLICATION FILED AUG. 5, 1905.
4 SHEETS—SHEET 2.
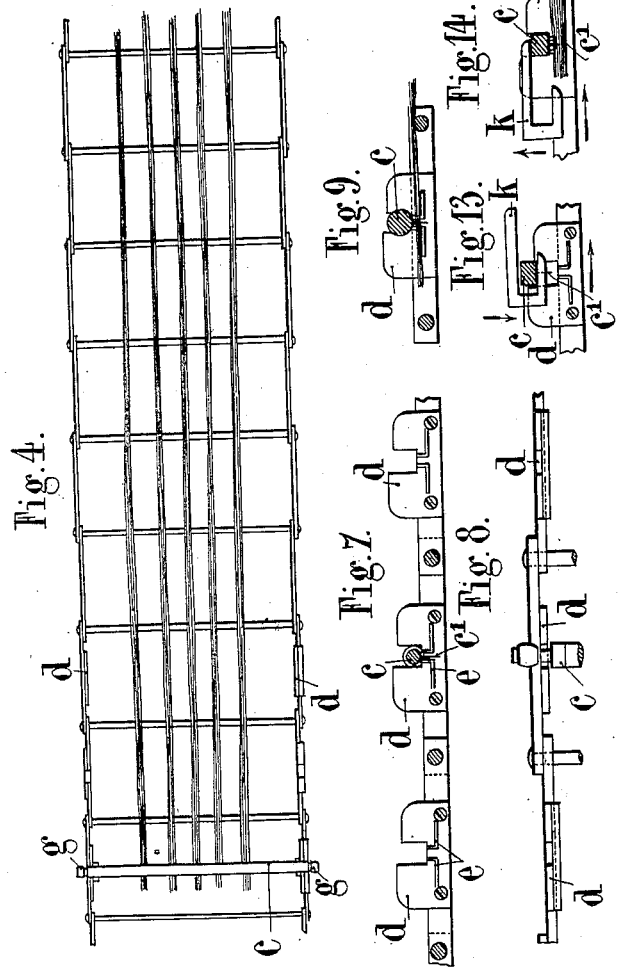
WITNESSES:
W. M. Avery
W. Harrison
INVENTOR
Jean M. A. Faure
BY
Munn & Co
ATTORNEYS No. 835,412. PATENTED NOV. 6, 1906.
J. M. A. FAURE.
MACHINE FOR DECORTICATING RAMIE AND OTHER FIBROUS PLANTS.
APPLICATION FILED AUG. 5, 1905.

4 SHEETS—SHEET 3.

WITNESSES:
W. M. Avery
W. Harrison

INVENTOR
Jean M. A. Faure
BY
Munn & C
ATTORNEYS

No. 835,412. PATENTED NOV. 6, 1906.
J. M. A. FAURE.
MACHINE FOR DECORTICATING RAMIE AND OTHER FIBROUS PLANTS.
APPLICATION FILED AUG. 5, 1905.
4 SHEETS—SHEET 4.

WITNESSES:
W. M. Avery
W. Harrison

INVENTOR
Jean M. A. Faure
BY Munn & Co
ATTORNEYS

UNITED STATES PATENT OFFICE.

JEAN MARIE ANDRÉ FAURE, OF LIMOGES, FRANCE.

MACHINE FOR DECORTICATING RAMIE AND OTHER FIBROUS PLANTS.

No. 835,412.   Specification of Letters Patent.   Patented Nov. 6, 1906.

Application filed August 5, 1905. Serial No. 272,936.

*To all whom it may concern:*

Be it known that I, JEAN MARIE ANDRÉ FAURE, engineer, of 21 Place du Champ de Foire, Limoges, Haute-Vienne, Republic of France, have invented Improvements in Machines for Decorticating Ramie and other Fibrous Plants, of which the following is a full, clear, and exact description.

In order that ramie and other textile plants may be thoroughly decorticated, it is necessary, first, that the stems or leaves should be submitted to the action of a coarse decorticator, which dissociates them, yielding a product composed of the matters separated, and, second, that the disintegrated product should be submitted to the action of a finishing-cleaner, which serves to get rid of the foreign matters entangled by the fibers.

The present invention consists of a finishing-cleaner adapted to operate in an automatic and continuous manner and so constructed as to effect in succession the introduction of the previously-disintegrated textile materials between a pair of cleaning scraper-cylinders and their subsequent submission to a drawing action in a direction opposed to that in which the cylinders tend to draw the materials, such action continuing until the stems, &c., are entirely disengaged from the cylinders.

The invention will be described with reference to the annexed drawings, which show the apparatus by way of example.

Figure 12:
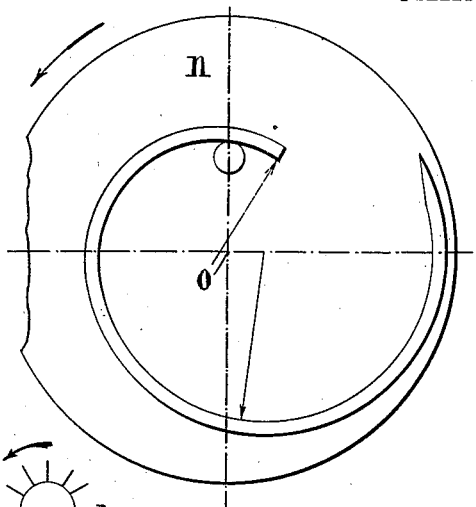
Figure 5:
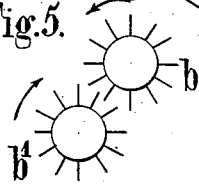
Figure 6:
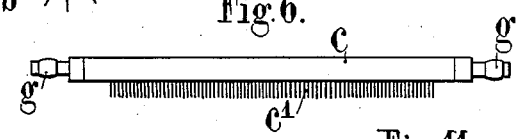
Figure 15:
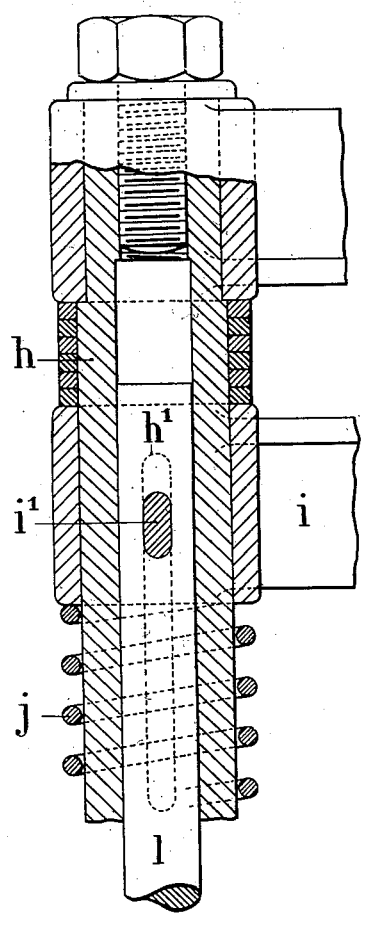
Figure 16:
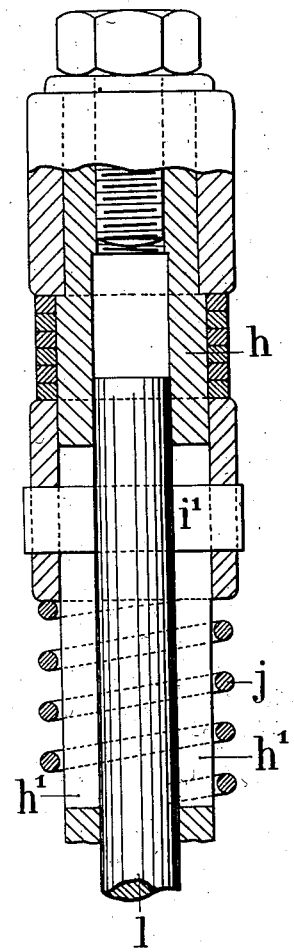

Figure 1 is a side elevation of the entire machine. Figs. 2 and 3 are vertical sections of the "purifying" apparatus, properly so called, showing the stems as they enter and leave the machine. Fig. 4 is a plan of the endless carrier employed. Fig. 5 shows in section the two scraping purifying-cylinders. Fig. 6 is a detail view of the comb by which the stems are fixed. Fig. 7 is a detail view showing the supports which are fixed upon the carrier and adapted to receive the comb, and Fig. 8 a corresponding plan view. Fig. 9 is a vertical transverse section showing the comb engaged with the carrier. Figs. 10 to 14 show an arrangement which permits of the automatic engagement of the comb with the carrier, Fig. 10 being an elevation, partly in section, and Fig. 11 an end view, while Fig. 12 is a detail view of the cam employed; and Figs. 13 and 14 are two detail views showing the comb engaged with the carrier. Fig. 15 is an enlarged fragmentary section showing the connection between one of the slides $l$ and the cross-bar $i$; and Fig. 16 is a section through the same mechanism shown in Fig. 15, but taken at a right angle relatively thereto.

Referring to the drawings, $a$ is an endless carrier upon which the stems as they are discharged from the coarse decorticating apparatus are either permitted to fall or placed by hand. The stems are fixed at their rear extremities to the carrier $a$, as hereinafter described, and as soon as their forward extremities arrive at the point of contact of the vertical tangent T their weight causes them to fall down vertically at the same speed as that at which the carrier travels, and they are thus caused to become engaged by a series of purifying scraping-cylinders $b\ b'$. As, however, the rear extremities of the stems are fixed to the carrier $a$, the stems are not released, and when their point of fixation is carried in the reverse direction the stems are automatically withdrawn from the scraping-cylinders $b\ b'$, as will be seen on referring to Fig. 3.

In their passage between the beaters of the scraping-cylinders the fibers, for the greater portion of their length at all events, are separated from the foreign matters with which they were entangled, and nothing remains to be done when the charge is released from the carrier except, if deemed desirable, to pass the extremities of the stems, which were fixed to the carrier and which were consequently not submitted to the scraping-cylinders, through independent cleaners.

The stems are placed side by side upon the carrier $a$ with their rear extremities in line, as shown in Fig. 4, and they are fixed to the carrier by means of the comb $c$, which is furnished with teeth $c'$, Figs. 6 and 9. This comb is held by two supports $d$, mounted opposite one another upon the cross-bars which form constituent elements of the carrier, said supports being provided for this purpose with gaps in which the corresponding extremities of the comb are received, Figs. 7, 8, 9. In order to make the fixation of the fibers by means of the comb more effective, the supports $d$, which are arranged opposite to one another, may be connected by two vertical arms or by means of two angle-pieces $e$, Figs. 8 and 9, separated by a space through which the points of the comb $c$ may pass. These pieces serve as an abutment for the fibers at the position where they should be engaged by the points of the comb and enable the latter to completely penetrate the fibers. The comb thus mounted on the carrier should be retained in the supports during its passage around the drum $a'$, and in order that this may be effected I provide two parallel guides $f$, attached to the side cheeks of the frame of the machine, upon the interior surface of which run friction-rollers $g$, mounted on the extremities of the comb $c$, so that the comb is held in place in opposition to the action of gravity, tending to disengage it from its supports. The comb $c$ is thus caused to partake of the movement of the carrier $a$, and when it passes over the drum $a'$ its motion is reversed, and it is consequently pulled in the reverse direction by the carrier drawing on the fibers, as has been previously mentioned. When the comb arrives at the extremity of the lower portion of the guides $f$, it falls under the action of gravity, carrying the cleaned fibers which are fixed on its teeth with it.

It is to be understood that the method of fixing the comb to the carrier is only given by way of example and that other arrangements may be substituted therefor.

The scraper-cylinders $b$ $b'$, which are shown separately in the detail view, Fig. 5, are furnished with pallets, which when the cylinders rotate engage the one between the other. These cylinders are geared together by toothed wheels, so as to turn in reverse directions, as indicated by the arrows. Instead of a single pair of scraper-cylinders the apparatus may be provided with two pairs or with even a larger number. The dimensions and the speed of rotation of these scraper-cylinders would vary according to the different applications of the machine.

The movement of the driving-shaft is transmitted to the drum $a'$ and to the cylinders $b$ by a train of wheels. (See Fig. 1.)

Figure 10:
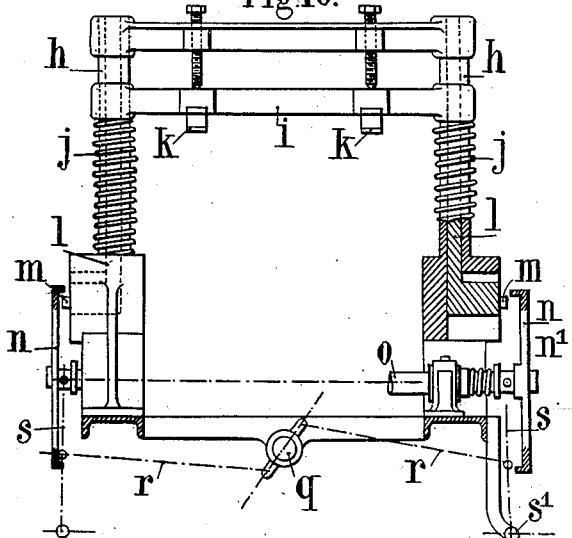
Figure 11:
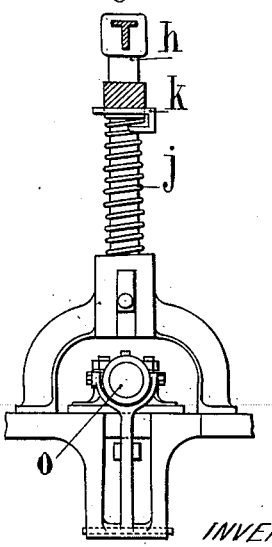

In the arrangement described the attendant places the comb $c$ in those supports $d$ of the carrier which are nearest to the rear extremities of the stems to be cleaned at the moment when these supports pass in front of him; but the engagement of the comb may be automatically effected by the following arrangement, Figs. 10 and 11: Upon the frame of the machine are mounted two channeled vertical columns $h$, braced at their upper part and serving to guide a cross-bar $i$, mounted to slide on the columns and pressed upward by the spiral springs $j$, which surround the columns. This cross-bar carries hooks $k$, adapted to receive the comb. At $l$ are slides fixed to the cross-bar at each end thereof and mounted so as to move vertically within the columns. These slides are furnished at their lower ends with rollers $m$, adapted to be acted upon at the proper moment by cams of the form shown in Fig. 12. The cams in question are mounted upon a cross-shaft $o$, which is rotated continuously from the main shaft $p$ of the machine by means of gear-wheels. These rotate the shaft $o$ once for each movement of the carrier, this movement being equal to the horizontal distance between two consecutive supports $d$. The cams $n$ are mounted to slide upon the shaft $o$ in such manner as to be separated under normal conditions from the rollers $m$ and to be caused to approach the latter at the moment when the cross-bar $i$ is to be lowered. The approach of the cams $n$ toward one another is effected by means of a two-armed lever keyed upon a shaft $q$ and connected by rods $r$ with two levers $s$, said levers respectively turning on axes $s'$ and each terminating in a fork which engages the sleeve $n'$ of the corresponding cam and moves the latter to and fro. Each slide $l$ is connected with the cross-bar $i$ by means of a pin $i'$, which works within a slot $h'$, as shown more particularly in Figs. 15 and 16.

At the moment when the comb held by the hooks $k$ of the cross-bar $i$ is to be placed upon the carrier to fix the stems, &c., the workman operates a hand-lever attached to shaft $q$ in such manner as to cause the cams $n$ to engage the rollers $m$, thus imparting to the rollers and the slides a downward movement and causing the cross-bar $i$ to descend and compress the springs $j$. The cross-bar $i$ then presents the comb $c$ to the supports $d$ of the carrier, Fig. 13, and causes it to engage with the latter, the comb, which is carried along by the movement of the carrier, disengaging itself from the lower limbs of the hooks $k$, said hooks, however, continuing to descend, so that their upper limbs compel the comb to bed itself in the stems to be cleaned, Fig. 14. When the comb is thus adjusted in place, the rollers $m$ are at the extremity of the cams and are released therefrom, and as soon as the springs $j$ return the cross-bar $i$ to its initial position the workman throws the cams $n$ out of action, so that at their next rotation they will not act on the rollers $m$. Another comb is then placed in the hooks of the cross-bar $i$, so that the same operation can be repeated as soon as the rear extremities of the next charge of stems present themselves.

The arrangement for automatically clamping the comb may vary in form and dimensions and its details may also be modified. With this automatic clamping arrangement the workman in charge of the machine only needs to lower the hand-lever at the moment when the rear extremities of the stems delivered from the coarse decorticator pass in front of him on the carrier $a$, and there is thus no time lost in fixing the stems.

The present invention enables ramie to be decorticated under very economical conditions, inasmuch as it economizes hand-labor and increases the output.

I claim—

1. A finishing-cleaner for decorticating ramie and other textile plants, comprising an endless carrier, transverse supports composed of two bars secured to the two edges of the carrier and having between them a small empty space, a comb the teeth of which may engage into the free space of these supports, scraper-cylinders arranged at one end of the carrier, substantially as described; a cam for actuating said comb periodically, and gearing connecting said carrier with said comb.

2. A finishing-cleaner for decorticating ramie and other textile plants, comprising an endless carrier, transverse supports composed of two bars secured to the two edges of the carrier and having between them a small empty space, a comb the teeth of which may engage into the free space of these supports, a cam for actuating said comb, gearing for insuring a positive motion between said carrier and said cam, and scraper-cylinders arranged at one end of the carrier, substantially as described.

3. A finishing-cleaner for decorticating ramie and other textile plants, comprising an endless carrier, transverse supports composed of two bars secured to the two edges of the carrier and having between them a small empty space, a comb the teeth of which may engage into the free space of these supports, a vertically-movable cross-bar, hooks secured to the said cross-bar, columns to guide said cross-bar, springs for returning the cross-bar upwardly, operating-rods secured to the cross-bar and located in the columns, cams capable of imparting to the cross-bar a downward motion, a device for bringing the cams nearer or farther, engaging or disengaging them from the operating-rods, scraper-cylinders arranged at one end of the carrier, substantially as described.

The foregoing specification on my improvements in machines for decorticating ramie and other fibrous plants signed by me this 8th day of July, 1905.

[L. S.]     JEAN MARIE ANDRÉ FAURE.

Witnesses:
    GABRIEL GOUTERON,
    PAUL THOMAL.